May 17, 1966  D. W. DUNIPACE ET AL  3,251,669
GLASS STREAM HEATING IN A CONTINUOUS RIBBON FURNACE
Filed Dec. 16, 1963  2 Sheets-Sheet 1
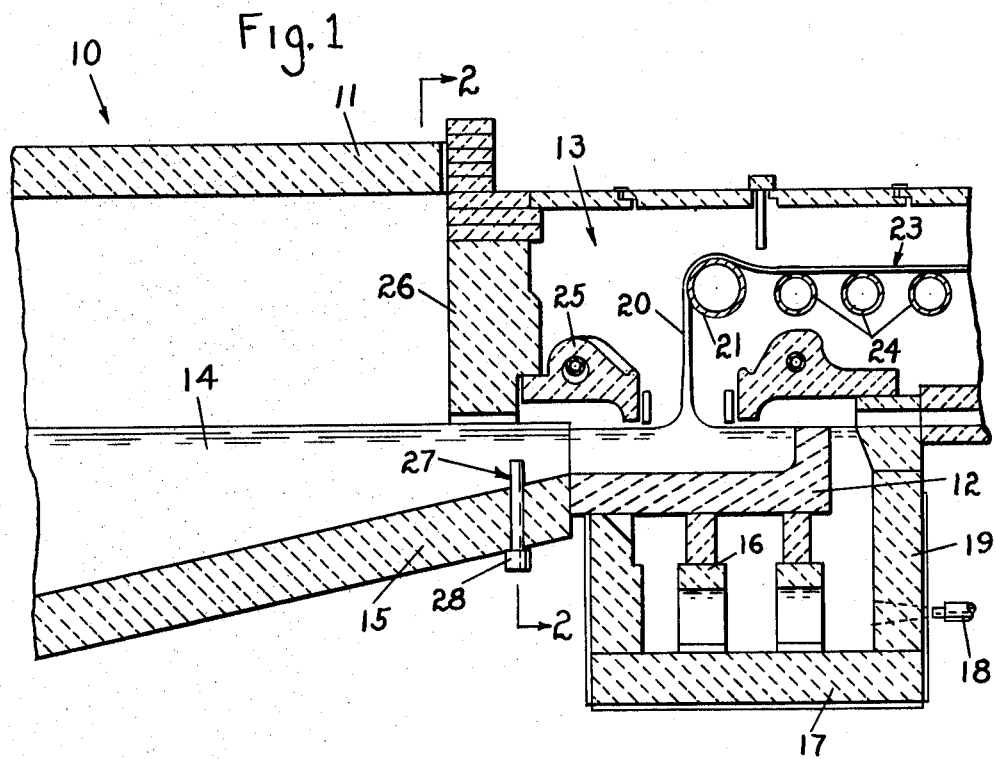
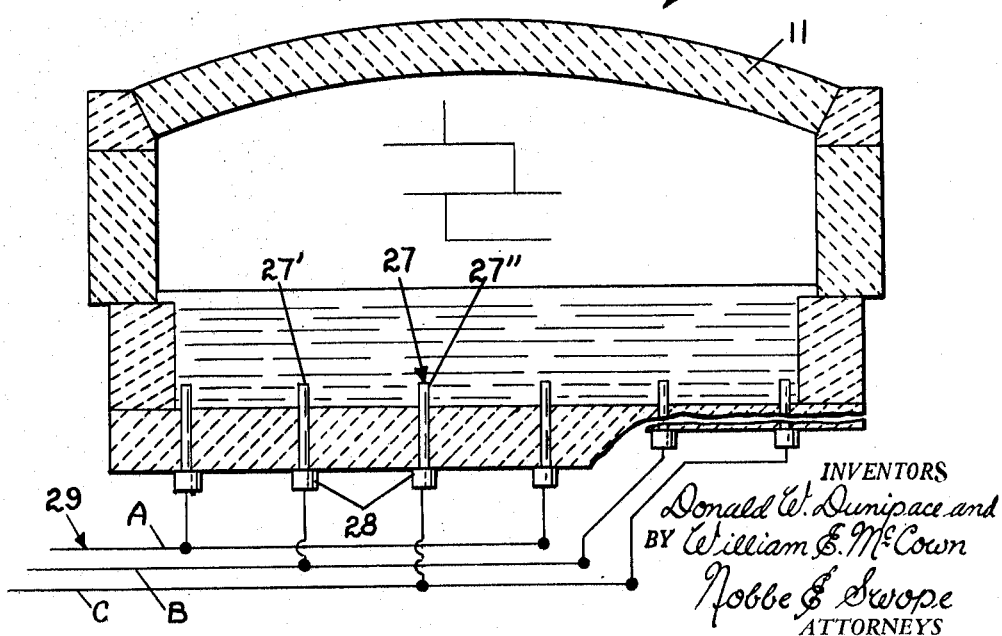
INVENTORS
Donald W. Dunipace and
BY William E. McCown
Nobbe & Swope
ATTORNEYS

United States Patent Office 3,251,669
Patented May 17, 1966

3,251,669
GLASS STREAM HEATING IN A CONTINUOUS RIBBON FURNACE
Donald W. Dunipace, Boulder, Colo., and William E. McCown, Toledo, Ohio, assignors to Libbey-Owens-Ford Glass Company, Toledo, Ohio, a corporation of Ohio
Filed Dec. 16, 1963, Ser. No. 332,334
6 Claims. (Cl. 65—90)

This application is a continuation-in-part of copending application Serial No. 817,196, filed June 1, 1959, now abandoned.

The present invention relates broadly to the production of a continuous ribbon or sheet from a mass of molten glass, and more particularly to improved techniques and apparatus for producing such a ribbon or sheet with a minimum of distortion.

The terms "ribbon" or "sheet" of glass, as used herein, are intended to mean either a flat drawn ribbon having fire polished surfaces obtained during the sheet formation (commonly known as "sheet glass" or "window glass"), or a so-called rough formed ribbon that is intended to be subsequently mechanically ground and/or polished on one or both surfaces (commonly known as "plate glass").

Although, as indicated above, the present invention is applicable to the production of different types of continuous glass ribbons, especially good results have been obtained by using it in the production of flat drawn window or sheet glass by the well known Colburn process, and it will be specifically described in that connection here.

As is well known, commercial sheet or window glass is produced by drawing a sheet or ribbon from a mass of molten glass directly into final usable form, and requires no subsequent surfacing treatment to impart smoothness and transparency. However, one of the disadvantages of flat drawn sheet glass, whether produced by the Colburn, or by other known processes, has been waviness or so-called "distortion" in the finished product.

Such distortion is due primarily to a lack of thickness uniformity or, more particularly, to abrupt or irregular changes in thickness variation. Different varieties of distortion are known in the art by various names which have been coined to designate specific types. Among these are "long wave distortion," "short wave distortion," "hammer," "batter," etc.

It is our belief that these distortion defects in the glass sheet are due to the presence of non-uniform and uncontrolled conditions within the conventional window glass furnace which includes standard melting, conditioning and working areas. More specifically, we have found that they are due to a lack of sufficiently uniform temperature conditions from side to side of the stream or channel of molten glass flowing toward the working end of the furnace and into the zone of sheet formation, as well as to the adverse influence of thermally induced air or convection currents that move toward, along and around the newly formed sheet.

Moreover, we have actually proven that the distortion difficulties that have heretofore been considered to be almost a characteristic of, as well as a necessary evil in commercial window glass can be overcome by proper control of atmospheric and temperature conditions within the furnace.

It is the primary aim of this invention to substantially reduce, if not to entirely eliminate certain distortion defects in window glass, and certain distortion problems in its production that are caused by non-symmetrical temperature patterns across the molten glass in the furnace that results in a lack of thickness uniformity in the drawn sheet.

Another object is to accomplish the desired results by improved control of the temperatures in the molten glass across the width of the furnace.

Another object is the provision of special procedures and combinations of apparatus for accomplishing the above aims.

Another, and more specific object, is to improve temperature uniformity, and to so eliminate alternate hot and cold streaks, spots and the like, in the molten glass as it approaches the zone of sheet formation.

Still another object is to provide what may be termed a "preferential," undersurface heating of the molten glass in this area that will give an accelerated heating of the colder portions of the molten mass and a retarded heating of the hotter portions whereby to provide a more completely uniform and stable temperature pattern transversely thereof.

Other objects and advantages of the invention will become more apparent during the course of the following description, when taken in connection with the accompanying drawings.

In the drawings, wherein like numerals are employed to designate like parts throughout the same:

FIG. 1 is a longitudinal sectional view through a portion of the conditioning zone and through the working zone of a conventional Colburn type window glass furnace, showing a preferred form of undersurface heating apparatus positioned in accordance with the invention;

FIG. 2 is a transverse vertical sectional view taken substantially along the lines 2—2 in FIG. 1;

Figure 9:
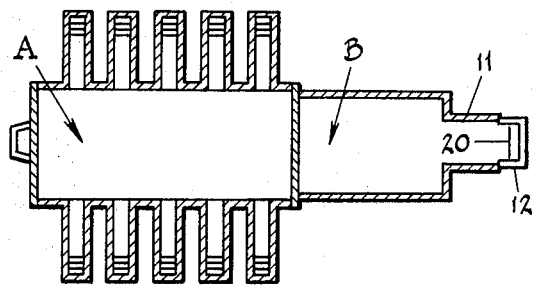
FIG. 9 is a plan view of a conventional Colburn-type window glass furnace.

Referring now more particularly to the drawings, and with specific reference to FIGS. 1, 2 and 9, there has been illustrated therein a continuous sheet glass furnace which is designated in its entirety by the numeral 10. Conventional furnaces of this character generally include a gas fired regenerative type melting tank A which supplies molten glass to one or more suitable refining or conditioning chambers B (FIG. 9). In the so-called Colburn-type of sheet glass drawing machine the forward end of the refining chamber B is joined by a cooling chamber 11 to a working receptacle or draw-pot 12 positioned below a drawing or forming chamber 13.

In this type of sheet glass furnace the molten glass moves in a stream from the melting to the working end of the furnace through a channel formed in the melting chamber, the refining chamber, the cooling chamber 11 and the working receptacle 12.

As the molten glass in the stream flows or moves through the refining chamber and the cooling chamber it is "conditioned" and tempered for proper working into sheet form. Also during this movement from the melting to the working end of the furnace the cross-sectional area of the stream is progressively reduced, due to the size and/or shape of the chambers through which it passes. In other words, the melting and refining chambers are conventionally wide and deep. The channel from the refining chamber is usually of the same depth but narrower than the melting chamber. The cooling chamber 11 is of less depth than the channel from the refining chamber and is usually narrower, terminating in a so-called "goose neck" or a similar restriction 15 to direct the stream into the relatively shallow working receptacle or draw-pot 12.

The draw-pot 12 in a conventional Colburn-type window glass machine is supported upon stools 16 within a pot chamber 17 which is heated by gas flames from burners 18 introduced into and through the walls 19.

A sheet or ribbon of glass 20 is continuously drawn upwardly from the surface of the molten bath in the draw-pot and, while still in a semi-plastic condition, although substantially set in its final sheet form is deflected into the horizontal plane about a bending roll 21, and then passed through a flattening chamber 23 upon a series of horizontally aligned machine rolls 24. The ribbon advances from the drawing and flattening chamber 23 into a lehr (not shown) wherein it is supported and carried along until suitably annealed.

In order to produce commercially acceptable window glass by flat drawing from a mass of molten glass it is essential: (1) that the molten glass be properly conditioned; (2) that it be at the optimum temperature for working into a flat ribbon; and (3) that the temperature pattern of the molten glass be as nearly symmetrical and stable as possible from one side of the stream to the other at the zone of sheet formation. No particular problem is presented in maintaining and even in controlling, within limits, the temperature of the molten glass within that portion of the working receptacle or draw-pot 12 from which the ribbon 20 is actually drawn because, as already explained, the major portion of the draw-pot 12 is conventionally supported within the heated pot chamber 19.

However during movement of the stream of molten glass 14 between the melting and working ends of the furnace, the glass is more or less continuously subjected to changes in temperature. Thus, the glass is melted at temperatures approaching 3000° F. Also, in refining the melted glass, relatively high temperatures are a necessary requirement and the temperature at the exit end of the channel from the refining chamber is normally around 2100° F. Within the cooling chamber 11 the molten glass in the stream is caused to lose heat rather rapidly to bring it to the optimum temperature desired for drawing into sheet form, normally around 1700° F.

It is, of course, desirable that this progressive cooling of the molten glass stream from melting to working temperature be accomplished as uniformly as possible so that, as the glass approaches the zone of sheet formation, the temperature in the stream will be as nearly uniform as possible throughout the width of the stream. However, as a practical matter, with the volume of glass that is normally handle in a commercial window glass furnace the achievement of anything closely approaching uniform temperature from side to side of the moving stream has heretofore been a virtual impossibility. Thus, the glass at the edge of the stream will naturally be colder than the glass in the middle of the stream and, due to a variety of conditions that are always present in a conventional window glass furnace, alternate hot and cold streaks, as well as spots and areas of different temperatures tend to develop in the glass stream as it approaches the exit end of the cooling chamber. Moreover, these areas are self-accentuating, i.e., because the colder areas move more slowly they will become still colder, while the hotter and faster moving areas will not be cooled as much.

This is well recognized in the art and various means have been tried in an effort to equalize the temperatures in the glass stream as it approaches the zone of sheet formation. Probably the one that has heretofore been considered most satisfactory and that has been most widely used is that of providing heating means above the surface of the molten glass in the space beneath the lip-tile 25 either with or without cooling means also arranged above the surface of the molten glass but in the cooling chamber adjacent the arch or end wall 26.

While such prior used means did improve uniformity of temperature to some degree they were open to a number of objections so far as their ultimate purpose of reducing distortion in and improving the quality of the finished sheet was concerned.

In the first place, the heating means provided beneath the lip-tile was usually an open flame burner commonly called a lip-tile fire which introduced a certain amount of dirt and products of combustion into a critical area of the furnace. Secondly such flames add to rather than decrease the uncontrolled air currents in the furnace and, as has been pointed out above, the presence of moving and uncontrolled currents of air in the furnace particularly at the zone of sheet formation is one of the principal factors responsible for distortion in the finished sheet. A still further objection to temperature control means that is located above the surface of the molten glass is that it defeats its own purpose. Thus, when it is attempted to supply sufficient heat over the glass stream to achieve the temperature pattern desired in the full depth of the stream for proper thickness control in the sheet being drawn, the upper strata from which the sheet is to be drawn becomes so hot as to objectionably limit the speed at which the sheet can be drawn.

Now, however, we have found that the glass stream, as it approaches the zone of sheet formation, can be heated in a manner to consistently give a temperature pattern of the symmetry necessary to permit a sheet of uniform thickness to be drawn, without heating the glass to a point where its speed of draw will be objectionably limited.

Essentially this is accomplished by undersurface heating of the stream. More particularly it is done by preferentially heating the stream below the surface thereof and preferably within the body of the molten glass.

Such heating also gives effective control of the undersurface temperature pattern in the molten glass flowing into the draw-pot which we have found to be of extreme importance in producing a sheet or ribbon of uniform thickness and free of distortion. This type of heating will also greatly reduce the presence of unwanted convection and uncontrolled air currents over the surface of the molten glass.

As an indication of the advantage of a sub-surface heating as opposed to oversurface heating, so far as the ability to add heat without objectionably limiting the speed of draw is concerned, it has been calculated that the amount of heat required to be added with a typical lip-tile fire in order to approach the desired temperature pattern in the stream will decrease the speed of draw by 15" per minute. On the other hand, the amount of heat required to give a similar control can be applied by undersurface heating with a decrease of only 3" in speed.

Another great advantage of the undersurface heating of this invention is that it is inherently preferential and, also according to the invention, can be made additionally so by the particular type of undersurface heating means employed. To illustrate, the application of a uniform heat input beneath the surface of the molten glass tends to be self-stabilizing. In other words, because hot glass naturally flows faster than colder glass, the colder and slower moving portions of the stream flowing past the undersurface heating means will remain in a position to absorb heat for a relatively longer period than will the hotter and so faster moving portions, with the result that the colder portions will be heated to a greater extent and the hotter portions to a lesser extent. Moreover, as the colder portions become heated they will move faster and so will automatically absorb less heat as their temperature increases.

With certain types of heating means this stabilizing effect can be accelerated to obtain greater uniformity of temperature across the stream in a shorter time. For example, by impressing an electric potential on the undersurface glass in a manner to heat it by the Joule effect, greater amounts of heat will automatically be applied to the colder than to the hotter glass along the path of current flow, regardless of the speed at which the glass is moving past the heating means, because the electrical resistance of the colder portions of the molten glass is greater than the resistance of the hotter portions, with the result that greater heat will be generated in the colder portions of the stream than in the hotter portions. Obviously of course this same thing will be true with any type of electrical, undersurfacing heating in which the heating element is an electrical conductor having electrical properties similar to glass, i.e., whose resistance increases as its temperaure falls and whose conductivity increases as its temperature rises.

A number of different types of specific heating means that may be used in carrying out the invention have been illustrated in the drawings. Thus, in FIGS. 1 and 2 the heating means are disclosed as a series of horizontally aligned, vertical electrodes 27 extending upwardly through the bottom of the cooling chamber into the stream of molten glass at spaced intervals across the width thereof. The electrodes are preferably positioned in the cooling chamber, adjacent its end, where the stream of molten glass is about to enter the draw-pot 12 and as it approaches the zone of sheet formation.

The exact location of the undersurface heating means in accordance with the invention will of course be dependent on actual operating conditions in the furnace but, for the most part, we have found that it is most effective in a Colburn type machine when located somewhere within an area that extends approximately two feet upstream from the upstream end of the heated draw-pot chamber, and when located approximately at or below the upper one half of the depth of the stream.

The electrodes 27 can be mounted relative to the bottom wall of the cooling chamber 11 by any suitable conventional electrode mounting means 28 that will permit raising and lowering of the electrodes to move them into and out of the furnace and to adjust them to the desired height in the molten stream, and which is susceptible of being air or water cooled where this is found desirable.

The electrodes themselves may be formed of any one of a number of suitable materials such as, for example, carbon or graphite, or a combination of the two, or chromium iron alloy, platinum or rare metal alloys, wrought iron or steel, copper, nickel, moylbdenum, zinc, etc.

Various electrical hook-ups may be used with the electrode arrangement shown in FIG. 2. For example, the endmost of the electrodes 27, to the left of the figure, may be connected to one lead A of a three phase cable 28; the next electrode 27' to the right is then connected to the lead B and the next electrode 27" to the remaining cable lead C. Successive adjacent electrodes across the width of the cooling chamber are similarly connected to the cable leads as shown. With such an electrical hook-up adjacent electrodes are always electrically supplied by different phases so that electrical current may be passed through the molten glass therebetween.

Figure 3:
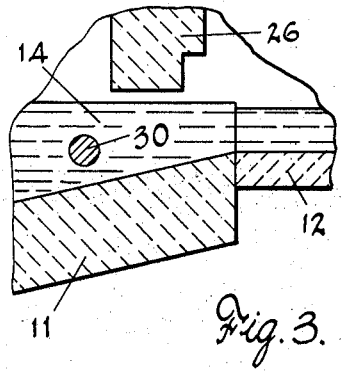
FIG. 3 is a fragmentary sectional view similar to FIG. 1 showing a modified undersurface heating means in the form of an electrical element.

In FIG. 3 there is disclosed a modified form of preferential or self-stabilizing device for undersurface heating of the stream of molten glass 14 in the cooling chamber 11, just prior to its entry into the draw-pot 12 and as it is approaching the zone of sheet formation. In this figure the heating means is in the form of resistance heating element 30 which may be a rod extending from one side of the cooling chamber to the other and connected to a suitable source of electrical energy (not shown). This form of heater will give preferential heating due to the fact, as explained above, that the colder portions of the glass stream moving therepast will remain in contact with the heated resistance element for a longer period than will the glass in the hotter and more rapidly moving portions. Moreover, by making the rod 30 of certain selected materials, such as carbon, which have the property of greater resistance to the passage of electricity as the temperture of the material falls and a lesser resistance as the temperature rises, this preferential heating or heat stabilizing effect can be increased.

Figure 4:
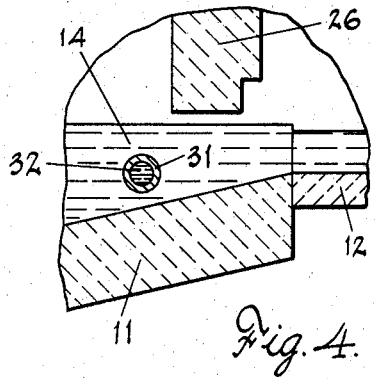
FIG. 4 is a similar view in which the heating element is a liquid, such as glass, confined in a tube.

In FIG. 4 there is illustrated a somewhat different type of heating device which, however, will function in a similar manner. As shown, the heating means is in the form of a hollow tube or cylinder 31, extending across and through the stream of molten glass 14 and which is filled with an electrically conducting liquid 32 such as molten glass. In the case of molten glass, by properly impressing a sufficient voltage on the liquid 32 it will be heated by the Joule effect. This apparatus of FIG. 4, although heating by the Joule effect, has certain advantages in that the tube 31, which surrounds the molten glass 32 in which the Joule effect heating takes place, will act to further channel and restrict the path of flow of electric current through the molten glass to permit better control of the undersurface heating pattern.

Figure 5:
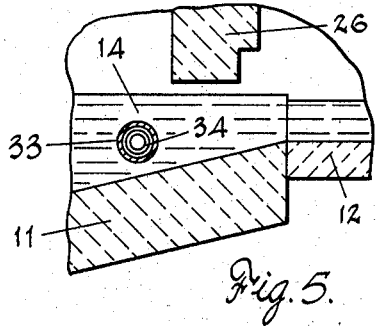
FIG. 5 is a sectional view similar to FIG. 4 in which the submerged tube is provided with a modified form of electrical heating means.

In FIG. 5 the heating means is also shown as including a tubular element 33 extending transversely of the molten glass, but within which is contained a solid resistance heating element such as a coil 34.

Figure 7:
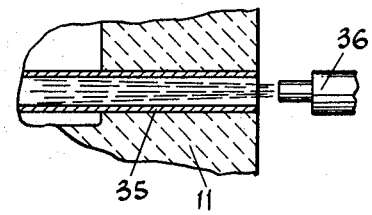
FIG. 7 is a fragmentary sectional view taken substantially along the lines 7—7 in FIG. 6.
Figure 6:
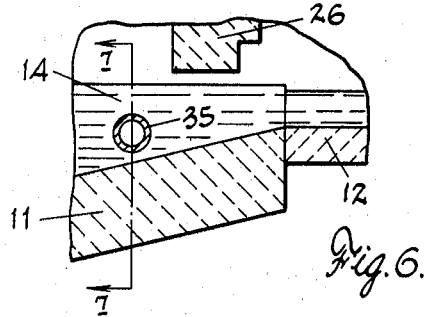
FIG. 6 is a similar view in which combustion heat is supplied to the interior of the tube.

In FIG. 6 the heating element again includes a transverse tube 35, but which is heated by combustion, preferably from its opposite ends, as by means of burners 36 (FIG. 7).

Figure 8:
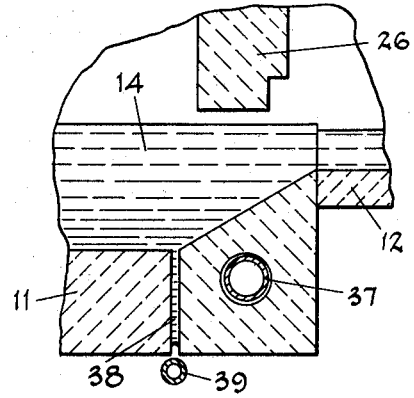
FIG. 8 is a fragmentary sectional view similar to FIG. 1 but showing a form of undersurface heating means that is located in the bottom wall of the cooling chamber.

In FIG. 8 there is disclosed a heating element similar to that described in connection with FIGS. 4 to 7, but which is located in a bottom wall of the cooling chamber 11 and extends transversely thereof below the molten stream 14. With this arrangement the tube 37 may be heated in any of the different ways disclosed in FIGS. 4 to 7, but it may require a greater heat input than with the heating means of the preceding figures because of the distance that the heating means is located below the surface of the molten glass in the stream 14.

Another problem that may arise with the apparatus disclosed in FIG. 8 is that, due to the relatively high temperature that may be created in the bottom wall of the cooling chamber 11, molten glass from the stream 14 may tend to flow into and through joints 38 between the individual blocks of which the bottom wall is composed. However, such leakage can be overcome by making the bottom wall in one piece, by making the blocks that compose the wall of sufficient depth that the molten glass will freeze up before reaching the bottom of the blocks, or by the provision of coolers such as shown at 39 which will act to freeze the glass within the joints.

It will be understood that the forms of the invention herewith shown and described are to be taken as illustrative embodiments only of the same, and that various changes in the shape, size and arrangement of parts, as well as various procedural changes may be resorted to without departing from the spirit of the invention or the scope of the subjoined claims.

We claim:

1. In a method of producing a continuous ribbon of glass from a tank type furnace in which a mass of molten glass is created and moved in a stream successively through a zone in which glass is melted, a zone in which the molten glass is refined, a zone in which the temperature of said refined glass is reduced and a working zone within which the molten glass is reheated and from which said ribbon is continuously formed and withdrawn from said mass of molten glass; the step of equalizing the lateral temperatures of the refined molten glass in said stream before it is formed into a ribbon by continuously applying heat from beneath the surface of said molten glass to a narrow area of a subsurface stratum extending completely across the width of said stream in said temperature reducing zone and before it reaches said heated working zone.

2. In a method of producing a continuous ribbon of glass by withdrawing the same from a mass of molten glass in and supplied to a working zone in a continuous stream from a refining zone; the steps of channeling said stream and reducing the cross-sectional area thereof and the temperature of the glass therein between said refining zone and said working zone, and continuously applying heat from below the surface of said channeled stream to a relatively narrow area extending completely across the width thereof while the cross-sectional area of the stream and the temperature of the glass therein is being reduced and before said molten glass reaches said working zone.

3. In apparatus for producing a continuous ribbon from a mass of molten glass the combination; with a heated tank within which the glass is melted, a tank within which the molten glass is refined, a chamber within which the temperature of the refined glass is reduced, and a heated working receptacle from which said ribbon is formed by withdrawing it from the mass of molten glass, arranged in end to end relationship and providing a channel through which said mass of molten glass can move continuously; of means located entirely within said temperature reducing chamber and below the molten glass level in said chamber for continuously heating a narrow area of molten glass extending completely across said chamber as it moves past said continuous heating means and before it reaches said heated working receptacle.

4. Apparatus as defined in claim 3 in which the heating means is an electrical resistance unit extending across the width of said stream.

5. Apparatus as defined in claim 3 in which the heating means includes a tube and heat is applied to the stream through said tube.

6. Apparatus as defined in claim 5 in which the interior of said tube is heated by combustion.

References Cited by the Examiner
UNITED STATES PATENTS

| | | |
|---|---|---|
| 2,417,913 | 3/1947 | Cornelius. |
| 2,780,032 | 2/1957 | Long _____ 65—204 |
| 2,921,106 | 1/1960 | Arbeit _____ 65—136 |
| 2,990,438 | 6/1961 | Lambert et al. |
| 3,094,578 | 6/1963 | Meriwether _____ 65—125 X |

FOREIGN PATENTS

| | | |
|---|---|---|
| 652,153 | 6/1934 | Germany. |
| 529,221 | 11/1940 | Great Britain. |

DONALL H. SYLVESTER, *Primary Examiner.*

F. M. MIGA, *Assistant Examiner.*